United States Patent

[11] 3,601,537

[72] Inventors Klaus Gueldenpfenning
Rochester;
Herman L. La Pierre, Holcomb, both of, N.Y.
[21] Appl. No. 800,945
[22] Filed Feb. 20, 1969
[45] Patented Aug. 24, 1971
[73] Assignee Stromberg-Carlson Corporation
Rochester, N.Y.

[54] METHOD OF AND DETECTING CIRCUIT FOR SYNCHRONIZING MASTER-REMOTE SIGNALLING SYSTEM
6 Claims, 2 Drawing Figs.

[52] U.S. Cl. .......... 178/69.5, 325/321
[51] Int. Cl. .......... H04l 7/00
[50] Field of Search .......... 178/69.5, 88, 68; 325/321, 325, 41; 340/146.1

[56] References Cited
UNITED STATES PATENTS

| | | | |
|---|---|---|---|
| 3,482,044 | 12/1969 | Kaneko .......... | 178/69.5 X |
| 3,491,338 | 1/1970 | Malloy .......... | 325/41 X |
| 3,509,277 | 4/1970 | Moore et al. .......... | 178/69.5 |
| 3,509,278 | 4/1970 | Bergholm .......... | 178/69.5 |
| 3,510,780 | 5/1970 | Buehrle .......... | 325/321 |

*Primary Examiner*—Robert L. Griffin
*Assistant Examiner*—R. S. Bell
*Attorney*—Hoffman Stone ABSTRACT: A master-remote, digital signalling system is synchronized at the beginning of each message to be transmitted by sending two pulses of distinctive length, which are detected at the receiver. The detector circuit includes counters and a series of gates for distinguishing the special synchronizing pulses from the message pulses.

INVENTORS
KLAUS GUELDENPFENNIG
H. LA PIERRE

BY Hopman Stone
ATTORNEY

INVENTORS
KLAUS GUELDENPFENNIG
H. LA PIERRE by: Hofman Stone
ATTORNEY

METHOD OF AND DETECTING CIRCUIT FOR SYNCHRONIZING MASTER-REMOTE SIGNALLING SYSTEM

BRIEF DESCRIPTION

This invention relates to a method of and detecting circuit for synchronizing receivers with transmitters in signalling systems of the type in which data, or information signals are sent in the form of trains of electrical pulses, which may occur at random times, and also following periods during which no signals are transmitted.

Synchronization in systems of the kind to which the present invention pertains must be positive for each train of data pulses to be transmitted. This is in contrast to ordinary systems of the pulse code modulated (PCM) type in which signals are continually transmitted in accordance with an ever repeating time frame, and in which the timing of the receiver may be repeatedly changed until proper synchronization is established.

Heretofore, in systems of the type to which the invention pertains, the usual practice has been to synchronize by transmitting a long series of pulses of equal duration to the data pulses, but in a pattern that is either not permitted, or not apt to occur in the data pulse trains. The prior practice is subject to two major disadvantages. First, a lot of time is used for synchronizing, and the capacity of the system if unduly limited. The importance of this may be better understood when it is appreciated that commonly the train of data pulses constituting any one message consists of only two words of some 24 bits each, a total of 48 bits, while the series of synchronizing pulses required for reliable operation must usually number at least 48 bits. Thus, half, or more, of the utilization, or working time of the system is required for synchronization alone, and is not available for data transmission. Second, one must either arrange things so that the bit sequence in the synchronization series can never arise in the data train, or accept the probability of false synchronization whenever the data pulse train happens to duplicate the synchronizing sequence. If the first alternative is chosen, as it must be in many cases, the capacity of the system is further limited in respect of the number of different kinds of messages that can be transmitted.

Briefly, the foregoing problems are overcome by the practice of the present invention, according to which positive synchronization is achieved without possibility of ambiguity and in a very short time, the interval normally occupied by three successive data pulses. An interval equal to one additional data pulse is provided to produce a START DATA signal for precise timing of the following train of data pulses.

The detector circuit of the invention includes a counter for counting the output pulses of the master clock of the receiver and producing output signals at predetermined intervals. The signals are used partially to enable gates at the times when changes in the incoming signal would occur if the incoming signal were a synchronizing signal. The incoming signals are also applied to the gates, which produce output signals only upon the occurrence of synchronizing signals.

DETAILED DESCRIPTION

A presently preferred embodiment of the invention will now be described in conjunction with the accompanying drawings, in which the two FIGURES, taken together, constitute a schematic circuit diagram of a detector circuit according to the invention.

Figure 1:
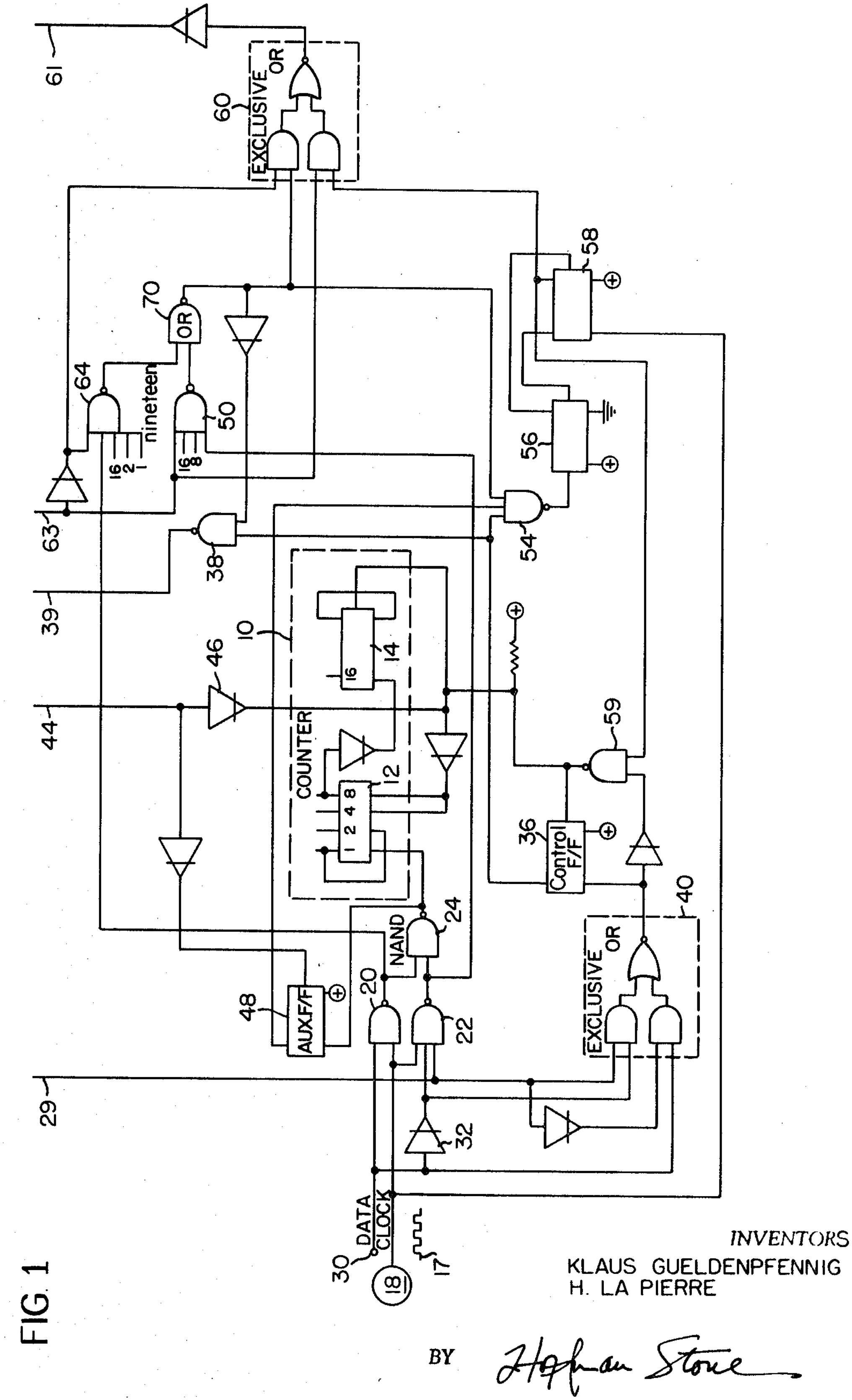
Figure 2:
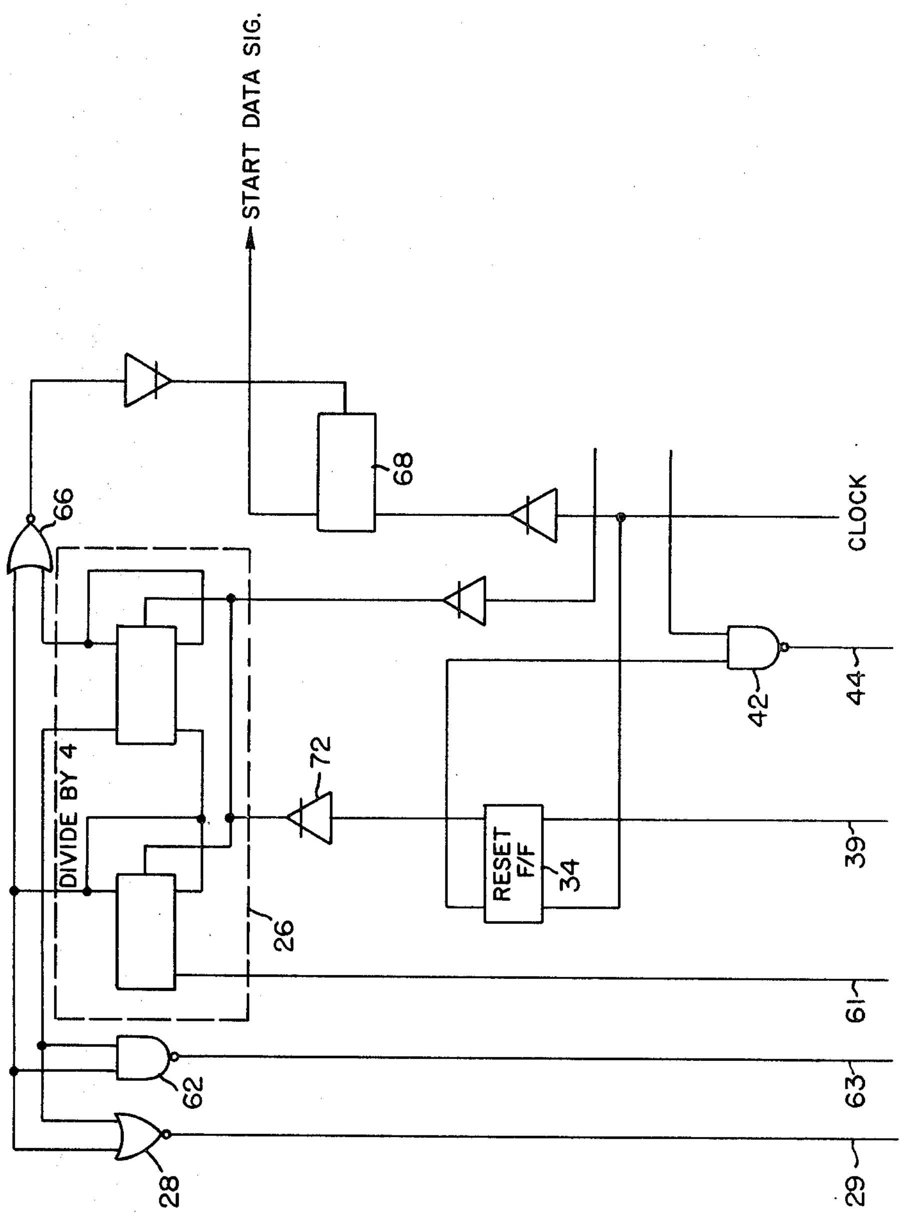

Referring now to the drawing, the detector circuit shown includes a counter 10 having a "16" count unit 12 and a "divide-by-two" flip-flop 14. The counter 10, thus, can count to 32. Input pulses 17 are applied to the counter 10 from the master clock 18 through gates 20, 22, and 24, respectively, which are selectively inhibited and partially enabled by incoming signals from the transmitter (not shown). In addition, one input to the second gate 22 is from a "divide-by-four" counter 26 (FIG. 2) through a NOR-gate 28 and the terminal designated 29 in both FIGURES.

The incoming data signals are applied at the input terminal 30 labeled DATA. Whenever the potential at the terminal 30 changes from a binary "zero" to a "one," that is, in the positive direction, the first NAND-gate 20 is partially enabled, and remains so until the potential returns to "zero." At the start of the detecting sequence, the second NAND gate 22 is inhibited by a "zero" from the input terminal 30 through the invertor 32. Until matters change, therefore, the output of the second NAND gate 22 remains at the "one" level.

The clock pulses 17 pass through the first NAND-gate 20 to drive the counter 10. If the signal at the terminal 30 is only a regular data pulse of 20 clock pulses duration, it returns to "-zero" at the count of 20 following the start of counting. The circuit is then immediately reset by a pulse from the RESET flip-flop 34 (FIG. 2) which is triggered by a CONTROL flip-flop 36 through a NAND-gate 38 and the terminal 39. The CONTROL flip-flop 36 is triggered by the output of an "EXCLUSIVE OR" gate 40, which changes from a "one" to "-zero" when the DATA input changes. The reset pulse from the flip-flop 34 is extended through a first NAND-gate 42 (FIG. 2) the terminal 44, and a second NAND-gate 46 to the counter 10. It is also fed to the CONTROL flip-flop 36 and to an auxiliary flip-flop 48 to reset them. The auxiliary flip-flop 48 was set on the first clock pulse at the start of counting and electrically latched in its set condition. The counter 10 is then ready to start counting again the next time the potential at the DATA terminal rises to a "one."

In the event that there is no change in the signal at the DATA terminal 30 in the interval between the 24th and 32nd counts, and the potential has remained at "one" from the start of counting, the counter 10 simply starts counting again. A "-time out" circuit (not shown) may be included to reset the counter 10 at any desired count to avoid possible false operation in response to regular data pulses. The timing of the "time out" signal, and whether it is needed or not will depend on collateral considerations which need not be detailed herein.

If the data signal at the terminal 30 is the first pulse of a synchronizing signal, it persists as a "one" for, nominally, 30 clock pulses, that is, one and one-half times the duration of a regular data pulse. The "16" and "8" outputs of the counter 10 are applied to the inputs of a "24" to 32" NAND-gate 50 along with an enabling voltage from the "divide-by-four" counter 26 (FIG. 2) and the output of the second NAND-gate 22 at the input of the first counter 10. When the counter 10 reaches the count of 24, the "24 to 32" gate becomes fully enabled and its output changes from a "one" to "zero." If thereafter, and before the count of 32, the data input changes to "zero," the CONTROL flip-flop 36 will be triggered by a change in the output of the EXCLUSIVE OR-gate 40, and extend a set pulse through a NAND-gate 54 to the first of two pulse-forming flip-flops 56 and 58, respectively. The first flip-flop 56 becomes momentarily set, resetting the second one 58, which thereupon resets the first one 56. The second flip-flop 58 again sets on the next clock pulse and becomes electrically latched in its set condition. The inverse output of the second flip-flop 58 is fed to one input of an EXCLUSIVE OR-gate 60, which responds to the output pulse and trips the "divide-by-four" counter 26 through the terminal 61. The flip-flop 58 also immediately resets the CONTROL flip-flop 36 and the counter is through the NAND-gate 59.

The output of the "divide-by-four" counter 26 is gated through the NOR-gate 28 to the input of the second NAND-gate 22 at the input of the first counter 10. When the "divide-by-four" counter is first pulsed, therefore, the second NAND-gate 22 is partially enabled, and the clock pulses pass through it to the counter 10. The NOR-gate 28 also feeds the EXCLUSIVE OR-gate 40, resetting it to produce a "zero" at this time.

The ensuing sequence is generally similar to the sequence just described. The counter 10 counts the clock pulses 17, and the "24 to 32" gate 50 becomes enabled at the count of 24, this time pulsing in synchronism with the clock pulses. If the potential at the DATA terminal 30 changes back to a "one" at about the 30th clock pulse, the auxiliary flip-flop 36 and the pulsing flip-flops 56 and 58 operate to produce a second output pulse from the EXCLUSIVE OR-gate 60 to step the "divide-bysfour" counter 26 again, this time to the count of "two." The output of the NOR-gate 28 changes back to "zero," inhibiting the second NAND-gate 22 at the input of the counter 10, and reestablishing the input conditions to produce a "zero" at the output of the EXCLUSIVE OR-gate 40. The clock pulses 17 then again drive the counter 10 through the first NAND-gate 20.

Synchronization is then complete, but for accurate timing and maximum reliability in identifying the data pulses, it is desired to delay the data pulse train and have it start coincidentally with a later clock pulse. For convenience, a count of 20 clock pulses is chosen. A START DATA pulse is generated during the interval between the 19th and 20th clock pulses, with its trailing edge coincident with the leading edge of the 20th clock pulse. The system is geared to start reading data pulses upon the occurrence of the trailing edge of the generated START DATA pulse.

When the "divide-by-four" counter 26 steps to the count of "two," its output, gated through the NAND-gate 62, inhibits the "24 to 32" gate 50, and partially enables a "19" gate 64 at the output of the main counter 10. The output of the NAND-gate 62, fed through the terminal 63, also appears at one of the inputs of the EXCLUSIVE OR-gate 60, and conditions it to respond to a change in the output of the "19" gate, without requiring a simultaneous change in the incoming signal at the DATA terminal 30. At the count of 19, an output pulse from the EXCLUSIVE OR gate 60 steps the "divide-by-four" counter to the count of "three," producing a signal at the output of a NOR-gate 66 to enable an output flip-flop 68. The output flip-flop 68 sets on the trailing edge of the 19th clock pulse following the second synchronizing pulse. The entire circuit is reset on the leading edge of the 20th clock pulse, causing the end of the output pulse to coincide with the start of the 20th pulse.

The resetting is accomplished through the RESET gate 38 and RESET flip-flop 34. When the "divide-by-four" counter steps to count "three," its output through the NOR-gate 28 causes the EXCLUSIVE OR-gate 40 to change from a "zero" to "one," setting the CONTROL flip-flop 36, and thereby partially enabling the NAND-gate 38. The output of the "divide-by-four" counter also changes the output of the NAND-gate 62 from "zero" to "one," inhibiting the "19" gate 64, producing a "zero" at the output of the OR-gate 70, and a "one" at the second input of the NAND-gate 38. This enables the RESET flip-flop 34, which then triggers to its set condition at the leading edge of the 20th clock pulse, resetting the main counter 10 through the gates 42 and 46, and the "divide-by-four" counter 26 through the invertor 72.

All of the flip-flops in the circuit shown are of the kind known commercially as TTyL, and negative logic is shown through the entire circuit. Those familiar with the art will appreciate that, with appropriate inversions of signals, positive logic could be used as well, and AND gates substituted for the NAND gates shown. Also, the exact length of the synchronizing pulses is a matter of arbitrary choice, and may be varied substantially without departing from the scope of the invention so long as they are made sufficiently different in length from the data pulses to be positively distinguishable at the receiver from the ordinary data pulses.

A pulse-generating circuit for producing synchronizing pulses of 30 clock pulses duration and of alternately "one" and "-zero" values is described and claimed in the companion application of Klaus Gueldenpfennig, Ser. No. 801,068 filed concurrently herewith, entitled, "Pulse Generator for Master-Remote Signalling System," and assigned to the present assignee.

What is claimed is:

1. Method of synchronizing a receiver in a digital signalling system of the master-remote type in which data is transmitted in the form of trains of electrical pulses of uniform length comprising transmitting at least two pulses each longer than the pulses used to transmit data and different in length from an integral number of the data pulses, the longer pulses being of predetermined polarities, distinguishing the longer pulses at the receiver from the pulses of uniform length, and synchronizing the receiver in response to the longer pulses.

2. Method according to claim 1 wherein the longer pulses are each one and one-half times as long as the pulses used to transmit data.

3. Method according to claim 1 wherein the first one of the longer pulses indicates a condition different from the "idle," or "stand-by" condition of the transmitter, and the second one indicates the "idle" condition.

4. Method according to claim 1 including the step of generating a momentary signal at a predetermined time following the end of the longer pulses to indicate to the receiver the exact start of the train of pulses used to transmit data.

5. An electrical circuit for detecting a series of electrical pulses of longer length than other pulses for establishing synchronization between a transmitter and a receiver in a digital signalling system of the master-remote type, said circuit comprising a clock for producing a continuous series of clock pulses, a counter for counting clock pulses to a total exceeding the duration of the long pulses, input gate means for controlling the input to said counter, output gate means for controlling the output of said counter, a divide-by-four counter responsive to said output gate means for selectively inhibiting and partially enabling said input gate means and said output gate means, means for applying clock pulses to said input gate means, said output gate means being arranged to step said divide-by-four counter when the incoming signal changes in a predetermined direction during a predetermined interval after the start of counting corresponding to the duration of the longer pulses to be detected so that said divide-by-four counter stops only in response to the longer pulses.

6. An electrical circuit for detecting a series of electrical pulses of longer length than other pulses for establishing synchronization between a transmitter and a receiver in a digital signalling system of the master-remote type, said circuit comprising:

a. a master clock for producing a continuous series of time-spaced clock pulses shorter in duration than the pulses to be detected, b. a first counter for counting clock pulses to a total exceeding the duration of the long pulses to be detected, c. input gate means for applying pulses from the master clock of the receiver to said counter, d. output gate means responsive to said counter for producing a control signal starting and ending at predetermined counts, e. a second counter, f. means for tripping said second counter in response to a change in the incoming signal that occurs during the control signal produced by said output gate means, g. gate means connected between said second counter and said tripping means in accordance with the instantaneous conditions of said second counter, and h. means for resetting said first and second counters in response to a change in the incoming signal that occurs at a time other than during the control signal produced by said output gate means.